(12) United States Patent
Zillmer et al.

(10) Patent No.: US 7,204,226 B2
(45) Date of Patent: Apr. 17, 2007

(54) MULTI-CYLINDER INTERNAL COMBUSTION ENGINE AND METHOD FOR THE INDIVIDUAL SHUTDOWN AND RESTART OF ITS CYLINDERS

(75) Inventors: Michael Zillmer, Sickte (DE); Ekkehard Pott, Gifhorn (DE); Matthias Holz, Lehre (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/271,386

(22) Filed: Nov. 10, 2005

(65) Prior Publication Data

US 2006/0144378 A1  Jul. 6, 2006

(30) Foreign Application Priority Data

Nov. 10, 2004  (DE) .................... 10 2004 054 166

(51) Int. Cl.
*F02D 17/02*  (2006.01)
(52) U.S. Cl. ............... 123/295; 123/299; 123/305; 123/481
(58) Field of Classification Search ........... 123/295, 123/299, 300, 305, 481, 198 F, 679
See application file for complete search history.

(56) References Cited

U.S. PATENT DOCUMENTS 5,337,720 A   8/1994  Murakami et al.
5,803,040 A   9/1998  Biesinger et al.

FOREIGN PATENT DOCUMENTS

| DE | 3316446  | 11/1983 |
|----|----------|---------|
| DE | 4292543  | 2/1997  |
| DE | 19546549 | 3/1997  |
| GB | 2119853  | 11/1993 |

*Primary Examiner*—Andrew M. Dolinar
(74) *Attorney, Agent, or Firm*—Baker Botts L.L.P.

(57) ABSTRACT

In a method for the individual shutdown and restart of cylinders of a multi-cylinder internal combustion engine having at least one intake and one exhaust valve per cylinder, a variable valve control, and a fuel injection system, according to the requirement of its shutdown, a deactivateable cylinder is filled with fresh gas and according to the requirement of its restart, an injection of a predetermined quantity of fuel as well as an ignition of the mixture takes place in the chronologically next intake phase or compression phase of the cylinder before the end of the compression phase at the latest. Furthermore, for the individual shutdown and restart of cylinders, the mass of fresh air present in the deactivateable cylinder in the deactivated operating state and/or the mixture parameters are determined and consulted for determining a fuel quantity to be injected when restarting said cylinder.

17 Claims, 2 Drawing Sheets

MULTI-CYLINDER INTERNAL COMBUSTION ENGINE AND METHOD FOR THE INDIVIDUAL SHUTDOWN AND RESTART OF ITS CYLINDERS

CROSS-REFERENCE TO RELATED APPLICATIONS

This application claims priority from German Patent Application No. 10 2004 054 166.3, which was filed on Nov. 10, 2004, and is incorporated herein by reference in its entirety.

TECHNICAL FIELD

The present invention relates to a multi-cylinder internal combustion engine as well as a method for the individual shutdown and restart of its cylinders.

BACKGROUND

Internal combustion engines have considerably lesser efficiency during partial load operation than during full load operation. Furthermore, due to the throttling losses, conventional gasoline engines, in particular, have markedly less partial load efficiency as opposed to diesel engines. Therefore, modern gasoline engines are being increasingly equipped with techniques for improving the partial load efficiency. In this connection, first of all, direct injection methods for gasoline engines must be mentioned that enable considerable increases in efficiency to be achieved by stratified operation or homogenous lean burn operation. Furthermore, methods for dethrottling the gasoline engine with partly or fully variable valve controls are used that enable the filling adjustment of the engine using opening times and closing times of the intake valves as well as using variable intake valve strokes.

Another possibility of achieving higher efficiency in multi-cylinder internal combustion engines exists in the shutdown of cylinders whereby a higher efficiency of the remaining cylinders can be achieved. Such a cylinder shutdown in series-production vehicles can be used preferably in high-cylinder engines, e.g. 8 or 12 cylinder engines by shutting down N/2 cylinders. In these engines, it is possible to ignite a sufficiently large number of cylinders having uniform angular ignition spacing even when shutting down half of the cylinders. Consequently, a comfortably acceptable running smoothness of the engine is achieved. In addition to methods that cut off only the fuel supply to the deactivated cylinders or interrupt the fresh air or the mixture supply over throttles, systems are known that carry out a method of shutdown by controlling the intake valves and exhaust valves. In the latter system, it is common to keep the intake valves as well as the exhaust valves closed after the combustion cycle in order to prevent the infiltration of crankcase gas through the filling remaining under excess pressure in the cylinder. The disadvantage here is that when restarting the deactivated cylinder, the combustion gas that is still present in the cylinder must first be expelled. This leads to a delay in the restart of the cylinder.

An engine control method is described in the patent application DE 42 92 543 C1 for a intake pipe injection engine in which only air is sucked into the deactivateable cylinders immediately before the shutdown and the combustion gas is prevented from being confined to the cylinders. When restarting a previously deactivated cylinder, the valve drive mechanisms that are associated with the deactivateable cylinders are released from the stoppage in the valve operation and are thus restarted. Furthermore, a rapid-acceleration detecting unit detects whether or not the engine is operating in a region of rapid acceleration. If the engine is operating in a region of rapid acceleration, then a preliminary fuel injection into the deactivateable cylinders is carried out. In a normal state, the fuel injection is started after the valve operation is restarted, that is, after only air is sucked into the deactivateable cylinders. Due to the intake pipe wall film effect during the indirect injection, an additional fuel mass that can be determined with difficulty is located in the cylinder during the restart of the previously deactivated cylinder. This leads to a high imprecision when metering the correct fuel mass for the required set air ratio during restart. In addition, a small quantity of fuel and oil enters into the cylinder combustion chamber via the blow-by depending on the duration of the shutdown phase. This leads to an additional change in the mixture composition.

Furthermore, the patent application DE 195 46 549 C1 describes a method of restarting a cylinder after an intake cycle and prior to an exhaust cycle. In order to prevent an undesired cooling of the combustion chamber, the patent application suggests that hot exhaust gas should remain in the deactivated cylinder during the shutdown phase.

In order to prevent an undesired torque jerk when shutting down and/or restarting cylinders, the patent application EP 1 298 300 A2 proposes to reduce the power of the cylinders to be shut down during the partial engine operation before shutdown and to simultaneously increase the power of the cylinders still running. When restarting the cylinders, their power is increased while the power of the cylinders still running is reduced or kept constant. Since a loss of gas can occur in a deactivated cylinder due to leakages, the patent application DE 33 16 446 A1 suggests that the intake valve be opened briefly even in a deactivated cylinder.

SUMMARY

The object of the present invention is to create a method for the individual shutdown and restart of cylinders of a multi-cylinder internal combustion engine using which it is possible to realize high precision when metering fuel when restarting a deactivated cylinder. Furthermore, the present invention aims to create a multi-cylinder internal combustion engine for carrying out said method.

According to the present invention, this object can be achieved by a method for the individual shutdown and restart of cylinders of a multi-cylinder internal combustion engine having at least one intake valve and at least one exhaust valve per cylinder, a variable valve control as well as a fuel injection system for directly injecting fuel into the cylinders, the method comprising the steps of: after the request of a cylinder shutdown, filling a deactivateable cylinder with fresh gas, and after the request of a cylinder restart, injecting a predetermined quantity of fuel into a deactivated cylinder as well as igniting the mixture in a chronologically next intake phase or compression phase of the deactivated cylinder before the end of a compression phase at the latest.

The object can also be achieved by a multi-cylinder internal combustion engine having at least one intake valve and at least one exhaust valve per cylinder, a variable valve control, as well as a fuel injection system for the direct injection of fuel into the cylinders, comprising a device for shutting down and restarting a cylinder, by means of which after request of a shutdown of a deactivateable cylinder, the deactivateable cylinder is filled with fresh gas, and after a request for its restart, an injection of a predetermined quantity of fuel into the cylinder as well as an ignition of the mixture is performed in the chronologically next intake phase or compression phase of the cylinder before the end of the compression phase at the latest.

The exhaust valve can be activated before the end of an expansion phase that follows the compression phase, and the intake valve can be activated after the activation of the exhaust valve. The exhaust valve can also be activated before the end of an expansion phase that follows the compression phase, and the intake valve can be activated before the start of the subsequent intake phase at the latest. A fresh air mass and/or mixture parameters existing in a deactivateable cylinder in a shutdown operating state can be determined and the determined fresh air mass and/or these mixture parameters can be consulted for determining a fuel quantity to be injected when restarting said cylinder. The internal combustion engine can be operated in at least one of the following operation modes selected from the group consisting of: homogeneous injection, homogeneous lean burn injection, stratified charge injection, homogeneous split injection and twin injection. A fuel injection, if necessary a first part of the fuel injection into said cylinder can be completed before the end of the intake phase at the latest if said cylinder is operated during restart in a homogeneous, homogeneous lean burn, homogeneous twin injection or homogeneous split operation modes. A mass of a gas present in a deactivated cylinder and/or an oxygen concentration and/or an hydrocarbon concentration in the gas present in a deactivated cylinder can be determined from a model and when restarting said deactivated cylinder, the predetermined fuel quantity can be selected depending on the determined value. Downstream of a deactivated cylinder, exhaust gas parameters, preferably the oxygen concentration and/or the hydrocarbon concentration, can be measured and consulted for adapting the model. For torque adjustment when restarting a deactivated cylinder, a targeted selection of an operation mode and/or of an ignition angle position for one or more combustion cycles of at least one cylinder may take place.

Thus, the present invention describes a method for the individual shutdown and restart of cylinders of an internal combustion engine having at least one intake valve and at least one exhaust valve per cylinder, a variable valve control as well as a fuel injection system for directly injecting fuel into the cylinders, whereby after a shutdown request, a deactivateable cylinder is filled with fresh gas and after a restart request, an injection of a predetermined quantity of fuel as well as an ignition of the mixture takes place in the chronologically next intake phase or compression phase of the cylinder before the end of the compression phase at the latest.

The method according to the present invention enables a more speedy and spontaneous restart of a deactivated cylinder and enables the restarted cylinder to deliver a torque contribution that meets requirements. Since the method works with a fuel injection for individual cylinders, a precise metering of the fuel quantity inserted into the cylinder that is restarted after shutdown can be achieved with positive effects on the fuel consumption, the pollutant emissions and the life-span of the catalytic converters that are arranged, if necessary, in the exhaust gas system of the internal combustion engine.

The filling of the cylinder with fresh air that takes place during a intake phase, without the injection of fuel, prevents fuel from getting deposited on the cylinder walls.

It is expedient that before the end of the expansion phase that follows the compression phase, the exhaust valve is activated and that the intake valve is activated after the activation of the exhaust valve and before the start of the subsequent intake phase at the latest.

In an additional embodiment of the present invention, an ignition device for said cylinder is activated with a predetermined time delay after activating the fuel injection and before activating the gas exchange valves. An improved spontaneity in restarting said cylinder is thus feasible.

According to another aspect of the present invention, in a method for the individual shutdown and restart of cylinders of a multi-cylinder internal combustion engine having variable valve control and a fuel injection system for individual cylinders, mixture parameters that are present in a deactivateable cylinder in the shutdown operating state are determined and said mixture parameters are consulted for determining a fuel quantity to be injected when restarting said cylinder. These mixture parameters are preferably determined from exhaust parameters that are measured downstream of the internal combustion engine.

The present invention can be used advantageously in an internal combustion engine that can be operated in at least one of the following operation modes: homogenous, homogeneous lean burn, homogeneous split, stratified charge or twin injection.

BRIEF DESCRIPTION OF THE DRAWINGS

Additional advantages and aspects of the present invention are specified independently of their summary in the claims in the following description of the embodiments with the help of drawings of which:

DETAILED DESCRIPTION

Figure 1:
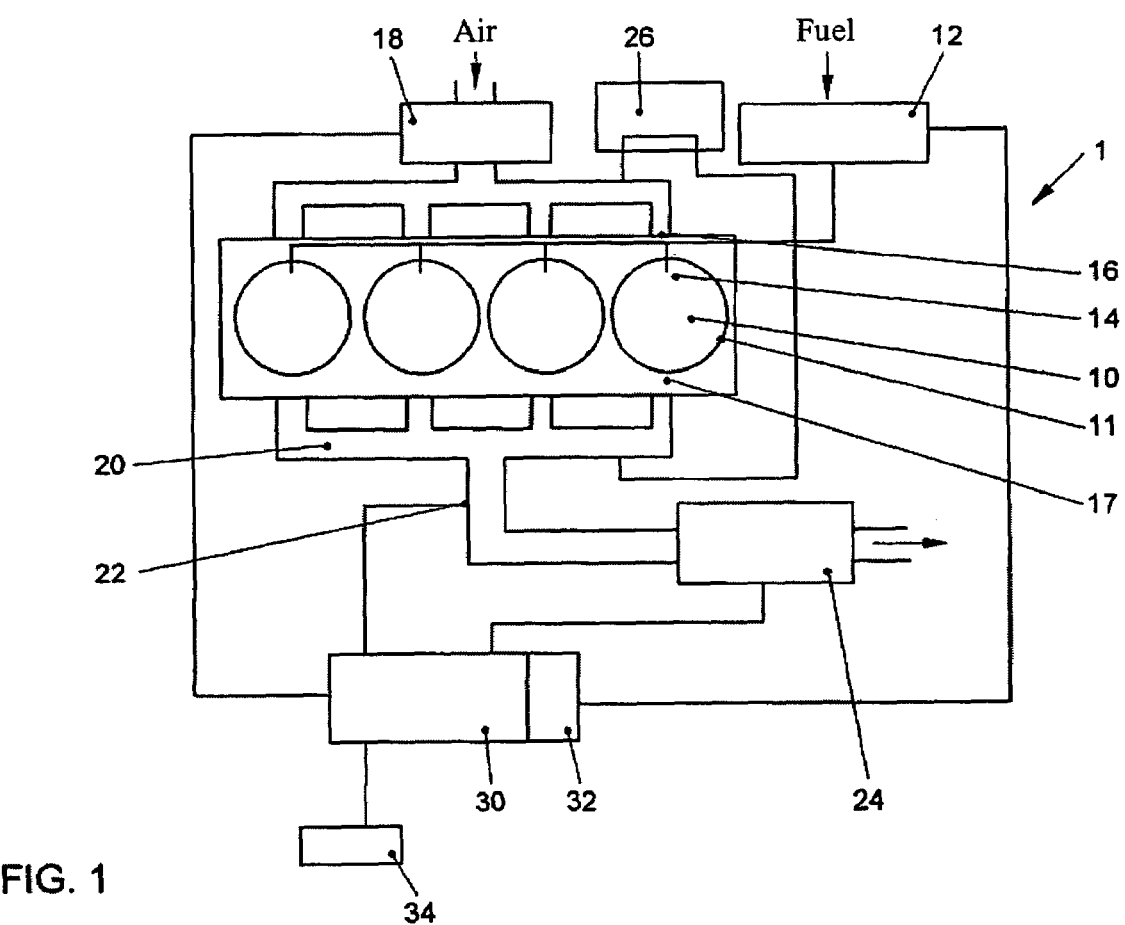
FIG. 1 schematically illustrates a gasoline engine having direct fuel injection.

FIG. 1 is a schematic illustration of an externally ignited direct injecting multi-cylinder gasoline engine 1 that is preferably capable of stratified charge operation. Fuel can be directly injected into a combustion chamber 10 of a cylinder 11 by means of a device for fuel injection 12. FIG. 1 illustrates an engine having a common rail injection. However, the present invention is also feasible by using conventional injection systems. An injector 14 is assigned to each cylinder 11 for injecting and metering the fuel. A intake valve 16 and an exhaust valve 17 are assigned to each cylinder 11 as gas exchange valves for controlling the gas exchange. Combustion air in the cylinder 11 is measured using an electronic throttle flap 18. The present invention also includes embodiments in which the internal combustion engine is designed as a diesel engine or in which details of the fuel injection systems and metering are configured differently than illustrated in FIG. 1.

Furthermore, an exhaust gas system 20 having a catalytic converter 24 is assigned to the engine 1. In addition, the present invention is also effective for engines having pre-catalytic converters and a main catalytic converter. Preferably, the precatalytic converter is configured as a 3-way catalytic converter and the main catalytic converter is configured as NOx storage catalytic converter (deNOx catalytic converter) in order to ensure the cleaning of the exhaust gas even in the particularly consumption-favorable stratified charge operation. Exhaust gas can be fed from the exhaust gas system 20 via an exhaust gas recirculation valve 26 for controlling the combustion behavior of the combustion air.

For controlling and/or regulating the different engine functions, an engine control device 30 is additionally provided that comprises signals of sensors 22, 34 for rpm, engine temperature, and catalytic converter temperature, of a throttle position as well as of a load requirement or output requirement and can meter fuel accordingly via the device 12. The control device 30 contains a module 32 for injection control of the fuel in the combustion chamber 10 as well as a device for shutdown and restart of at least one cylinder by means of which a requirement of a shutdown and/or restart can set in. Moreover, the intake valve 16 and the exhaust valve 17 can be activated, deactivated, opened, and closed using a control module 32.

The internal combustion engine 1 is constructively designed so as to implement a cylinder shutdown. A cylinder shutdown is preferable in which individual intake valves or preferably intake and exhaust valves of individual cylinders can be deactivated by switching the stroke of the cams of the engine camshaft to 0 strokes. However, the present invention comprises all the embodiments of a cylinder shutdown in which intake valves and/or exhaust valves of individual or several cylinders can be deactivated. In the deactivated state, the gas exchange valve is closed. In the activated state, the gas exchange valve can be opened at a predetermined time-point. In such a cylinder shutdown, even the injection system 12 for said cylinder is deactivated for a predetermined interval of time. In the case of an externally ignited engine, even the ignition device of said cylinder can be deactivated during the shutdown. Alternatively, the ignition device can be activated even during the cylinder shutdown. It is preferable to shut down N/2 cylinders. In the case of engines having a high number of cylinders, for example, 8 cylinder or 12 cylinder engines, it is possible to achieve a comfortably sufficient running smoothness of the engine even when shutting down half of the cylinders.

According to the present invention, the cylinder is shut down according to the requirement of its shutdown by deactivating the intake valve after the intake of fresh air mass. The deactivateable cylinder is therefore filled with fresh gas in the shutdown operating state. According to a requirement of restarting the cylinder, the injection system is activated in the chronologically next intake phase or compression phase before the end of the compression phase at the latest and a predetermined quantity of fuel is injected into the cylinder. Furthermore, the mixture present in the cylinder is ignited before the end of the compression phase at the latest.

Figure 2:
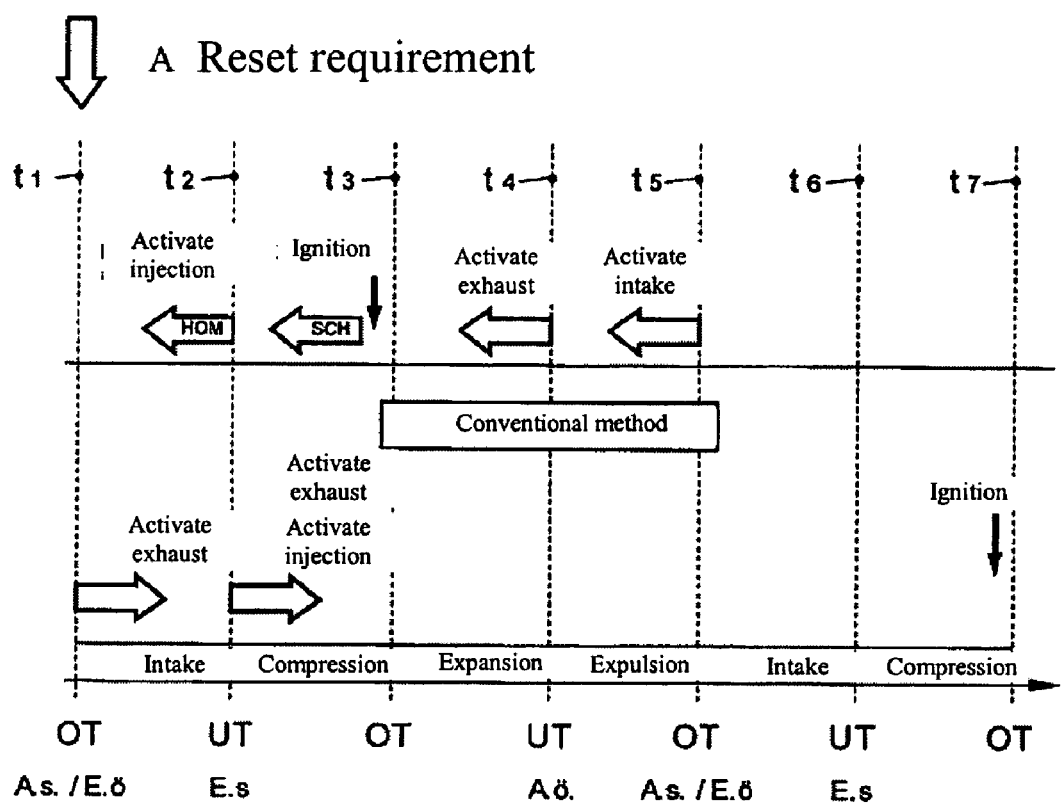
FIG. 2 illustrates a chronological sequence in the method according to the present invention for restarting a deactivated cylinder compared to a conventional method, depending on the crank angle.

FIG. 2 illustrates the operation mode of the method according to the present invention according to a requirement of restarting a deactivated cylinder in comparison to a conventional method, each depending on the crank angle. A sequence of intake phase, compression phase, expansion phase, expulsion phase, intake phase and compression phase of the combustion cycles of the internal combustion engine are illustrated from a time-point $t_1$ to a time-point $t_7$. In the lower section of FIG. 2, the operation mode of a conventional method is illustrated in which exhaust gas remains in the cylinder. OT and UT mark the top dead center and the bottom dead center of the crankshaft angle respectively. A.s., A.ö. and E.s. and E.ö. indicate the closing (s) and opening (ö) of the exhaust valve (A) and the intake valve (E) respectively. A.s. and A.ö. and E.s. and E.ö. indicate the usual closing and opening times respectively of the gas intake valves in a normal operation of the internal combustion engine. FIG. 2 illustrates the latest possible time-points for activating the gas exchange valves as well as for injection and ignition according to the method described in the present invention and the earliest possible time-points for the conventional method.

According to the present invention, a predetermined fuel quantity is injected into said cylinder when restarting a cylinder that is present in a shutdown state at the time-point $t_1$ in a intake or compression phase, i.e. in a time interval of $t_3$–$t_1$. In the subsequent expansion phase, i.e. in a time interval of $t_4$–$t_3$, the exhaust valve 17 is activated. The intake valve 16 is activated before the start of the next intake phase at the latest, i.e. the top dead center OT of the crank angle during charge change.

A precise metering of fuel to the fresh air mass enclosed in the cylinder is possible using the direct fuel supply according to the invention in the time interval of $t_4$–$t_3$. Apart from that, the delayed injection prevents any long-lasting contact of the injected fuel with the walls of the combustion chamber. A torque control can also take place according to the present invention by the appropriate selection of the opening and closing times of the exhaust valve or the intake valve and/or the ignition angle position as well as the operation mode.

In the conventional method illustrated in the lower section of FIG. 2, the exhaust valve is deactivated during the cylinder shutdown before the end of the expansion phase. Simultaneously or subsequently, the intake valve is deactivated before the next time-point "Intake opens." Therefore, residual gas mass of the last ignited cycle of the cylinder is enclosed under pressure in the deactivated cylinder. Due to the higher pressure in the cylinder it is possible to prevent the blow-by gases from escaping the crankcase. In the conventional method, according to the requirement of a restart, the exhaust valve can be activated at the time-point $t_1$ at the earliest and the intake valve as well as the injection can be activated at the time-point $t_2$ at the earliest. Before igniting the mixture when restarting the cylinder, operating cycles for expelling the residual gas mass and for drawing in fresh gas mass are required so that a time delay during shutdown is unavoidable. In the conventional method, the ignition can take place only in the time interval of $t_7$–$t_6$.

It goes without saying that in the method according to the present invention, even a region having a valve overlap, i.e. a simultaneous activation of gas exchange valves, is also possible.

In a preferred embodiment of the method, when shutting down said cylinder, the fuel injection is deactivated and said cylinder is filled with fresh gas in the shutdown operating state. The activation of the ignition device of said cylinder takes place using a predetermined time delay after activating the fuel injection system and before activating the gas exchange valves taking into account the provisioning time for e.g. the spark coil and the like that must be taken into consideration for adhering to the ignition times.

Depending on the type of the internal combustion engine and the available operation modes, a deactivated cylinder can be restarted in various operation modes. The time-point of the activation of the fuel injection system as well as the injection into said cylinder is selected variably depending on the operation mode during the restart of the cylinder. A fuel injection into said cylinder is concluded preferably during restart in a homogeneous operation mode before the end of the intake phase. In a homogeneous split operation mode, only the first part of the injection is concluded before the end of the intake phase. Sufficient time can be made available for the mixture homogenization by this selection of the injection time. If the previously shut down cylinder is operated in a stratified charge operation mode during restart, a fuel injection is carried out preferably during the compression phase in order to ensure the desired charge stratification in the combustion chamber of the cylinder. If necessary, the ignition device is activated at an appropriate time-point during the intake phase and/or the compression phase.

Furthermore, a targeted selection of an operation mode and/or an ignition angle position for one or more combustion cycles of at least one cylinder takes place for the purpose of torque adjustment when restarting a deactivated cylinder.

Since the gas mass in the deactivated cylinder can change during the shutdown due to leakage influences, mixture parameters, preferably oxygen concentration and/or the hydrocarbon concentration of the gas mixture present in the cylinder are determined in the shutdown operating state of said cylinder according to an advantageous embodiment of the present invention that is also feasible In the case of an engine having intake pipe injection. A substantial leakage can occur due to the so-called blow-by, mainly as a blow-by loss between piston and cylinder tube. The fresh air mass and/or mixture parameters of the gas mass, preferably the oxygen concentration and/or the hydrocarbon concentration in the gas mass present in a deactivated cylinder, are determined according to a preferred embodiment of the present invention. It goes without saying that this aspect of the present invention is also applicable in a method in which at least one part of the gas mass present in the cylinder when shutting down the cylinder consists of exhaust gas. The predetermined fuel quantity to be injected when restarting said cylinder is then selected depending on the determined values of the mixture parameters. The values are determined, for example, by means of a model formed in the control device 30. Components such as the cam shaft space, the crank space and oil recirculation devices that are relevant for the cylinder dynamics are illustrated in such a model and the chronological progression of the blow-by quantity or its temporal average value are determined. Furthermore, the present invention also includes the use of an empirical model in which the mixture parameters present in the shutdown operating state of said cylinder are stored as values in a memory of the control device 30.

In a particularly preferred embodiment of the present invention, one or more sensors 22 arranged downstream of the combustion machine record exhaust parameters, for example, an oxygen concentration (lambda value) and/or a hydrocarbon concentration are recorded and inferences on the value of mixture parameters in the cylinder in the shutdown state are drawn from this. Preferably a recording of the exhaust gas parameters for individual cylinders and a calculation of such values based on the recorded mixture deviations in the exhaust gas system are feasible.

The determined mixture parameters are consulted for determining the fuel quantity to be injected that was preset when restarting said cylinder. In particular, the aforementioned model can be adapted to the subsequent combustion cycles of the cylinder. This procedure also enables the wear and aging influences of the internal combustion engine to be taken into consideration. Examples of such influences are an increase in the running clearance between the cylinder wall and the piston.

By determining the fuel quantity to be injected when restarting a deactivated cylinder depending on the mixture parameters existing in the deactivated cylinder, it is possible to ensure a high precision of the fuel mass to be preset when restarting said cylinder over the entire lifespan of the engine.

LIST OF REFERENCE SYMBOLS

1 Internal combustion engine
10 Combustion chamber
11 Cylinder
12 Fuel injection system
14 Injector
16 Intake valve
17 Exhaust valve
18 Electronic throttle flap
20 Exhaust gas system
22 Sensor
24 Catalytic converter
30 Control device
32 Control module
34 Sensors

What is claimed is:

1. A method for the individual shutdown and restart of cylinders of a multi-cylinder internal combustion engine having at least one intake valve and at least one exhaust valve per cylinder, a variable valve control as well as a fuel injection system for directly injecting fuel into the cylinders, the method comprising the steps of:
   after the request of a cylinder shutdown, filling a deactivateable cylinder with fresh gas, and
   after the request of a cylinder restart, injecting a predetermined quantity of fuel into a deactivated cylinder as well as igniting the mixture in a chronologically next intake phase or compression phase of the deactivated cylinder before the end of a compression phase at the latest.

2. A method according to claim 1, wherein the exhaust valve is activated before the end of an expansion phase that follows the compression phase, and the intake valve is activated after the activation of the exhaust valve.

3. A method according to claim 1, wherein the exhaust valve is activated before the end of an expansion phase that follows the compression phase, and the intake valve is activated before the start of the subsequent intake phase at the latest.

4. A method according to claim 1, wherein a fresh air mass and/or mixture parameters existing in a deactivateable cylinder in a shutdown operating state are determined and the determined fresh air mass and/or these mixture parameters are consulted for determining a fuel quantity to be injected when restarting said cylinder.

5. A method according to claim 1, wherein the internal combustion engine can be operated in at least one of the following operation modes selected from the group consisting of: homogeneous injection, homogeneous lean burn injection, stratified charge injection, homogeneous split injection and twin injection.

6. A method according to claim 1, wherein a fuel injection, if necessary a first part of the fuel injection into said cylinder is completed before the end of the intake phase at the latest if said cylinder is operated during restart in a homogeneous, homogeneous lean burn, homogeneous twin injection or homogeneous split operation modes.

7. A method according to claim 1, wherein a mass of a gas present in a deactivated cylinder and/or an oxygen concentration and/or an hydrocarbon concentration in the gas present in a deactivated cylinder is determined from a model and when restarting said deactivated cylinder, the predetermined fuel quantity is selected depending on the determined value.

8. A method according to claim 7, wherein downstream of a deactivated cylinder, exhaust gas parameters, preferably the oxygen concentration and/or the hydrocarbon concentration, are measured and consulted for adapting the model.

9. A method according to claim 1, wherein for torque adjustment when restarting a deactivated cylinder, a targeted selection of an operation mode and/or of an ignition angle position for one or more combustion cycles of at least one cylinder takes place.

10. A multi-cylinder internal combustion engine having at least one intake valve and at least one exhaust valve per cylinder, a variable valve control, as well as a fuel injection system for the direct injection of fuel into the cylinders, comprising a device for shutting down and restarting a cylinder, by means of which after request of a shutdown of a deactivateable cylinder, the deactivateable cylinder is filled with fresh gas, and after a request for its restart, an injection of a predetermined quantity of fuel into the cylinder as well as an ignition of the mixture is performed in the chronologically next intake phase or compression phase of the cylinder before the end of the compression phase at the latest.

11. A multi-cylinder internal combustion engine according to claim 9, wherein the device for shutting down and restarting a cylinder determines fresh air mass and mixture parameters present in a deactivateable cylinder in a shutdown operating state and the determined fresh air mass and/or mixture parameters are consulted for determining a fuel quantity to be injected when restarting said cylinder.

12. A multi-cylinder internal combustion engine according to claim 9, comprising means for activating the exhaust valve before the end of an expansion phase that follows the compression phase, and for activating the intake valve after the activation of the exhaust valve.

13. A multi-cylinder internal combustion engine according to claim 9, wherein the internal combustion engine can be operated in at least one of the following operation modes selected from the group consisting of: homogeneous injection, homogeneous lean burn injection, stratified charge injection, homogeneous split injection and twin injection.

14. A multi-cylinder internal combustion engine according to claim 9, wherein a fuel injection, if necessary a first part of the fuel injection into said cylinder is completed before the end of the intake phase at the latest if said cylinder is operated during restart in a homogeneous, homogeneous lean burn, homogeneous twin injection or homogeneous split operation modes.

15. A multi-cylinder internal combustion engine according to claim 9, wherein a mass of a gas present in a deactivated cylinder and/or an oxygen concentration and/or an hydrocarbon concentration in the gas present in a deactivated cylinder is determined from a model and when restarting said deactivated cylinder, the predetermined fuel quantity is selected depending on the determined value.

16. A multi-cylinder internal combustion engine according to claim 15, wherein downstream of a deactivated cylinder, exhaust gas parameters, preferably the oxygen concentration and/or the hydrocarbon concentration, are measured and consulted for adapting the model.

17. A multi-cylinder internal combustion engine according to claim 9, wherein for torque adjustment when restarting a deactivated cylinder, a targeted selection of an operation mode and/or of an ignition angle position for one or more combustion cycles of at least one cylinder takes place.

* * * * *